US012649859B2

(12) United States Patent (10) Patent No.: US 12,649,859 B2
Kageyama et al. (45) Date of Patent: Jun. 9, 2026

(54) ALUMINUM-OXIDE-BASED-COMPOSITION-CONTAINING ZIRCONIUM NITRIDE POWDER AND METHOD FOR PRODUCING SAME

(71) Applicants: Mitsubishi Materials Electronic Chemicals Co., Ltd., Akita (JP); MITSUBISHI MATERIALS CORPORATION, Tokyo (JP)

(72) Inventors: Kensuke Kageyama, Akita (JP); Takuya Shiyama, Akita (JP); Naoyuki Aiba, Akita (JP); Riho Taguchi, Akita (JP); Hiroto Akaike, Naka (JP); Norihisa Chitose, Naka (JP)

(73) Assignees: Mitsubishi Materials Electronic Chemicals Co., Ltd., Akita (JP); MITSUBISHI MATERIALS CORPORATION, Tokyo (JP)

( * ) Notice: Subject to any disclaimer, the term of this patent is extended or adjusted under 35 U.S.C. 154(b) by 192 days.

(21) Appl. No.: 18/683,262

(22) PCT Filed: Aug. 26, 2022

(86) PCT No.: PCT/JP2022/032237
§ 371 (c)(1),
(2) Date: Feb. 13, 2024

(87) PCT Pub. No.: WO2023/053809
PCT Pub. Date: Apr. 6, 2023

(65) Prior Publication Data
US 2024/0343927 A1 Oct. 17, 2024

(30) Foreign Application Priority Data
Sep. 28, 2021 (JP) ................................. 2021-157335

(51) Int. Cl.
*C09D 7/61* (2018.01)
*C08K 3/22* (2006.01)
(Continued)

(52) U.S. Cl.
CPC .............. *C09D 7/61* (2018.01); *C09C 1/0009* (2013.01); *C09C 3/043* (2013.01); *C09D 5/32* (2013.01);
(Continued)

(58) Field of Classification Search
CPC .......... C09D 7/61; C09D 5/32; C09D 133/04; C09C 1/009; C09C 3/043; G02B 5/003;
(Continued)

(56) References Cited

U.S. PATENT DOCUMENTS

2020/0319373 A1* 10/2020 Konishi ................. C01G 25/00
2021/0115219 A1 4/2021 Inoue et al.

FOREIGN PATENT DOCUMENTS

CN 109650898 A 4/2019
CN 111511680 A 8/2020
(Continued)

OTHER PUBLICATIONS

International Search Report mailed Oct. 18, 2022, issued for PCT/JP2022/032237 and English translation thereof.
(Continued)

*Primary Examiner* — Bijan Ahvazi
(74) *Attorney, Agent, or Firm* — Troutman Pepper Locke LLP; James E. Armstrong, IV

(57) ABSTRACT

This aluminum-oxide-based-composition-containing zirconium nitride powder contains particles each of which is mainly composed of zirconium nitride and has a surface to which an aluminum oxide-based composition partially adheres, in which the aluminum-oxide-based-composition-containing zirconium nitride powder contains aluminum in
(Continued)

a proportion of greater than 1% by mass and 15% by mass or less in terms of a total content of 100% by mass, and has a specific surface area of 30 m²/g to 90 m²/g measured by a BET method. This powder has relatively high light shielding properties in a near infrared region with a wavelength of 1,000 nm, has excellent patterning and visible light shielding properties, and has favorable moisture resistance, when the powder is used to form a black patterned film as a black pigment.

11 Claims, 2 Drawing Sheets

(51) Int. Cl.

| | | |
|---|---|---|
| *C09C 1/00* | (2006.01) | |
| *C09C 3/04* | (2006.01) | |
| *C09D 5/32* | (2006.01) | |
| *C09D 133/04* | (2006.01) | |
| *G02B 5/00* | (2006.01) | |

(52) U.S. Cl.
CPC ........... *C09D 133/04* (2013.01); *G02B 5/003* (2013.01); *C01P 2006/12* (2013.01); *C01P 2006/60* (2013.01); *C01P 2006/80* (2013.01); *C08K 2003/2227* (2013.01); *C08K 2201/005* (2013.01)

(58) Field of Classification Search
CPC ...... C09K 2003/2227; C09K 2201/005; C01P 2006/12; C01P 2006/60; C01P 2006/80; C08K 2003/2227; C08K 2201/005
See application file for complete search history.

(56) References Cited

FOREIGN PATENT DOCUMENTS

| | | | |
|---|---|---|---|
| JP | 2009-091205 | A | 4/2009 |
| JP | 2017-222559 | A | 12/2017 |
| JP | 2019-112275 | A | 7/2019 |
| JP | 2020-012023 | A | 1/2020 |
| JP | 2020-158377 | A | 10/2020 |
| WO | 2019/059359 | A1 | 3/2019 |

OTHER PUBLICATIONS

Office Action issued in corresponding Chinese Patent Application No. CN 202280065830.5, mailed Nov. 11, 2025, with English translation.

* cited by examiner

ALUMINUM-OXIDE-BASED-COMPOSITION-CONTAINING ZIRCONIUM NITRIDE POWDER AND METHOD FOR PRODUCING SAME

TECHNICAL FIELD

The present invention relates to an aluminum-oxide-based-composition-containing zirconium nitride powder that is suitably used as an insulating black pigment and a method for producing the same. In the present specification, an "aluminum oxide-based composition" refers to a composition that contains alumina ($Al_2O_3$), aluminum hydroxide ($Al(OH)_3$), and other ingredients in a mixed state.

Priority is claimed on Japanese Patent Application No. 2021-157335, filed Sep. 28, 2021, the content of which is incorporated herein by reference.

BACKGROUND ART

This type of the black pigment is dispersed in a photosensitive resin to prepare a black photosensitive composition. This composition is applied onto a substrate to form a photoresist film, and the photoresist film is exposed by a photolithography method to form a patterned film. The obtained patterned film is used for a black matrix of an image forming element such as a color filter of a liquid crystal display. Since carbon black as a black pigment in the related art is conductive, the carbon black is not suitable for applications requiring insulation.

For example, in Patent Document 1 (see claim 1, claim 3, and paragraph [0007]), a zirconium nitride powder that forms a high-resolution patterned film when used to form a black patterned film as a black pigment and that has high light shielding performance of the formed patterned film, and a method for producing the zirconium nitride powder are disclosed. This zirconium nitride powder has a specific surface area of 20 to 90 $m^2/g$ as measured by a BET method, has a peak corresponding to zirconium nitride but does not have a peak corresponding to zirconium dioxide, a peak corresponding to substoichiometric zirconium oxide or a peak corresponding to substoichiometric zirconium oxynitride in an X-ray diffraction profile, and a light transmittance X at 370 nm is at least 18%, a light transmittance Y at 550 nm is 12% or less and a ratio (X/Y) of the light transmittance X at 370 nm to the light transmittance Y at 550 nm is 2.5 or more in a transmission spectrum of a dispersion that contains the powder at a concentration of 50 ppm.

The zirconium nitride powder described in Patent Document 1 is produced by mixing zirconium dioxide or a zirconium dioxide powder onto which silica has been coated, a metallic magnesium powder, and a magnesium nitride powder so that a molar ratio of the metallic magnesium is 2.0 to 6.0 per mole of the zirconium dioxide, and a molar ratio of the magnesium nitride is 0.3 to 3.0 per mole of the zirconium dioxide, to obtain a mixture, and then firing the mixture in an atmosphere of a nitrogen gas alone, or a mixed gas of a nitrogen gas and a hydrogen gas, or a mixed gas of a nitrogen gas and an ammonia gas at a temperature of 650° C. to 900° C., to reduce the zirconium dioxide powder.

However, in a case where the zirconium nitride powder shown in Patent Document 1 is left in, for example, 80° C. and 85% high temperature and high humidity atmosphere, a surface of a zirconium nitride particle is oxidized. Thus, when a patterned film was formed by using this zirconium nitride powder, there were issues that the moisture resistance of the film was insufficient, and light shielding performance thereof deteriorated.

In order to solve these issues, in Patent Document 2 (claim 1, claim 2, and paragraph [0006]), a zirconium nitride powder that can improve compatibility with an acrylic resin and the like, and can also improve moisture resistance in combination with a gas barrier property, and a method for producing the same are disclosed.

In addition, in Patent Document 3 (claim 1, claim 2, paragraph [0010], and paragraph [0033]), a powder for forming a black light-shielding film that is used as a black pigment to form a black light-shielding film excellent in ultraviolet transmittance and having a high-resolution patterning property, in which the formed black light-shielding film has high light shielding performance and high resistance to weather, and a method for producing the same are disclosed.

The zirconium nitride powder described in Patent Document 2 is a powder that is coated with alumina and composed of zirconium nitride particles, in which a volume resistivity is $1\times10^6$ Ω·cm or greater, a coating amount with alumina is 1.5% by mass to 9% by mass with respect to 100% by mass of the zirconium nitride, and an isoelectric point is 5.7 or greater.

The method for producing a zirconium nitride powder described in Patent Document 2 includes the steps of: grinding a zirconium nitride particle in water to prepare a zirconium nitride slurry, dissolving an aluminum compound in a solvent to prepare an aluminum compound solution, adding the aluminum compound solution to the zirconium nitride slurry so that [zirconium nitride particle]:[aluminum oxide] has a mass ratio of (100:1.5) to (100:15), coating the zirconium nitride particle with the aluminum compound by adding an acid to the zirconium nitride slurry to which the aluminum compound solution has been added, so as to adjust a pH of the zirconium nitride slurry and deposit the aluminum compound on the surface of the zirconium nitride particle, washing and then collecting the zirconium nitride particle coated with the aluminum compound, obtaining the zirconium nitride particle coated with aluminum oxide by firing this collected zirconium nitride particle coated with the aluminum compound in an air or nitrogen atmosphere at a temperature of 60° C. to 200° C. for 1 hour to 24 hours.

On the other hand, the powder for forming a black light-shielding film disclosed in Patent Document 3 is composed of particles for forming a black light-shielding film, which have a specific surface area of 20 to 90 $m^2/g$ measured by the BET method, contain zirconium nitride as a main component, and contains magnesium and/or aluminum, and when containing the magnesium, the content of the magnesium is 0.01% to 1.0% by mass relative to 100% by mass of the powder for forming a black light-shielding film, and when containing the aluminum, the content of the aluminum is 0.01% to 1.0% by mass with respect to 100% by mass of the powder for forming a black light-shielding film.

The method for producing a powder for forming a black light-shielding film disclosed in Patent Document 3 is used to produce a powder for forming a black light-shielding film by mixing zirconium dioxide powder, metallic magnesium powder, magnesium oxide powder or magnesium nitride powder, and aluminum oxide powder or aluminum nitride powder so that the metallic magnesium is 25% to 150% by mass with respect to 100% by mass of the zirconium dioxide (equivalent to a molar ratio of metallic magnesium of 1.27 to 7.6 per mole of zirconium dioxide), the magnesium oxide is 15% to 500% by mass with respect to 100% by mass of the zirconium dioxide (equivalent to a molar ratio of magnesium oxide/zirconium dioxide of 0.46 to 15.3), and the aluminum oxide or aluminum nitride is 0.02% to 5.0% by mass with respect to 100% by mass of the zirconium dioxide (equivalent to a molar ratio of aluminum oxide or aluminum nitride/zirconium dioxide of 0.00048 to 0.12), firing the obtained mixed powder under an atmosphere of a sole nitrogen gas, under an atmosphere of a mixed gas of a nitrogen gas and a hydrogen gas, under an atmosphere of a mixed gas of a nitrogen gas and an ammonia gas, or under an atmosphere of a nitrogen gas and an inert gas at a temperature of 650° C. to 900° C. to reduce the mixed powder.

CITATION LIST

Patent Documents

[Patent Document 1]
  Japanese Unexamined Patent Application, First Publication No. 2017-222559
[Patent Document 2]
  Japanese Unexamined Patent Application, First Publication No. 2020-158377
[Patent Document 3]
  Japanese Unexamined Patent Application, First Publication No. 2019-112275

SUMMARY OF INVENTION

Technical Problem

In recent years, in optical elements such as image sensors, there have been an increasing need for shielding the near infrared region with a wavelength of about 1,000 nm in order to suppress noise, and an increasing demand for a film that shields not only the conventional visible light region but also the near infrared region.

However, there was an issue that a powder composed of zirconium nitride particles coated with alumina shown in Patent Document 2 can improve compatibility with an acrylic resin and the like, and can also improve moisture resistance in combination with gas barrier properties; however, when the powder was used to form a black patterned film as a black pigment, the powder was not able to increase the light shielding properties in the near infrared region with a wavelength of 1,000 nm. The reason therefor is that surfaces of the zirconium nitride particles were coated with alumina, and for the purpose of suppressing the sedimentation of the particles in a case of being used as a resist, zirconium nitride was subjected to a grinding treatment in the initial stage of production so that a zirconium nitride powder was refined to have a size of a BET specific surface area of greater than 90 m²/g (with an average particle diameter of less than 10 nm) to reduce crystallinity.

In addition, in a case where the powder for forming a black light-shielding film described in Patent Document 3 contains zirconium nitride as a main component and contains aluminum, a content of aluminum is 1.0% by mass or less with respect to 100% by mass of the powder for forming a black light-shielding film. It is described in Patent Document 3 that the light shielding performance of the black light-shielding film deteriorates in a case where the content is greater than 1.0% by mass.

The present inventors found that in a case where aluminum is used as a reducing agent for zirconium oxide in the Thermite process, a visible light shielding property of a film is not reduced even in a case where a content of aluminum is increased, the crystallinity of zirconium nitride particles is kept high without being deteriorated, and the transmittance in the ultraviolet range is not deteriorated without coarsening the zirconium nitride particles, and achieved the present invention.

In addition, the present inventors found that in a case where aluminum is used as a reducing agent for zirconium oxide in the Thermit process, the firing temperature of a mixed powder needs to be higher than 900° C. and 1,100° C. or less, which is higher than 650° C. to 900° C. described in Patent Document 3, and achieved the present invention.

An object of the present invention is to provide a favorable aluminum-oxide-based-composition-containing zirconium nitride powder that has relatively high light shielding properties in a near infrared region with a wavelength of 1,000 nm when the powder is used to form a black patterned film as a black pigment, has excellent patterning and visible light shielding properties, and has favorable moisture resistance.

Solution to Problem

A first aspect of the present invention is an aluminum-oxide-based-composition-containing zirconium nitride powder including particles each of which is mainly composed of zirconium nitride and has a surface to which an aluminum oxide-based composition partially adheres, in which the aluminum-oxide-based-composition-containing zirconium nitride powder contains aluminum in a proportion of greater than 1% by mass and 15% by mass or less in terms of a total content of 100% by mass, and has a specific surface area of 30 m²/g to 90 m²/g measured by a BET method. The BET specific surface area is a value measured by using nitrogen as an adsorbate.

A second aspect of the present invention is an invention depending on the first aspect and the aluminum-oxide-based-composition-containing zirconium nitride powder, in which in a case where a dispersion is prepared so that a concentration of the aluminum-oxide-based-composition-containing zirconium nitride powder is 50 ppm (mass ppm, the same applies hereinafter), and a transmission spectrum of the dispersion is measured, a light transmittance X at 370 nm is 20% or greater, a light transmittance Y at 1,000 nm is 35% or less, and a ratio (X/Y) of the light transmittance X at 370 nm to the light transmittance Y at 1,000 nm is 1.2 or greater. As a dispersion medium of the dispersion, for example, a propylene glycol monomethyl ether acetate (PGM-Ac) solvent is used. An optical path length in the measurement of the light transmittance is set to 1 cm (the same applies hereinafter).

A third aspect of the present invention is a method for producing the aluminum-oxide-based-composition-containing zirconium nitride powder according to the first or second aspect, the method including: mixing a zirconium oxide powder with an aluminum-containing powder at a molar ratio of the aluminum-containing powder of 0.05 to 0.8 per mole of the zirconium oxide powder, a metallic magnesium powder at a molar ratio of the metallic magnesium powder of 2.0 to 6.0 per mole of the zirconium oxide powder, and a magnesium oxide powder at a molar ratio of the magnesium oxide powder of 0.3 to 5.0 per mole of the zirconium oxide powder to obtain a mixture; and firing the mixture at a temperature of higher than 900° C. and 1,100° C. or less for 60 minutes to 180 minutes in a nitrogen gas atmosphere to reduce the zirconium oxide powder.

A fourth aspect of the present invention is an invention depending on the third aspect, and is the method for producing the aluminum-oxide-based-composition-containing zirconium nitride powder, in which the aluminum-containing powder is a powder composed of any one or more of metallic aluminum, alumina, an aluminate compound, or aluminum hydroxide.

A fifth aspect of the present invention is a black dispersion that is formed by dispersing the aluminum-oxide-based-composition-containing zirconium nitride powder according to the first or second aspect in a solvent or a monomer compound.

A sixth aspect of the present invention is a black photosensitive composition including the aluminum-oxide-based-composition-containing zirconium nitride powder according to the first or second aspect as a black pigment.

A seventh aspect of the present invention is a black patterned film that is obtained by using the black photosensitive composition according to the sixth aspect.

An eighth aspect of the present invention is a black matrix that is obtained by using the black patterned film according to the seventh aspect.

A ninth aspect of the present invention is a light shielding material that is obtained by using the black patterned film according to the seventh aspect.

A tenth aspect of the present invention is a light shielding filter that is obtained by using the black patterned film according to the seventh aspect.

An eleventh aspect of the present invention is a black film including a support film and the black patterned film according to the seventh aspect on the support film.

Advantageous Effects of Invention

The aluminum-oxide-based-composition-containing zirconium nitride powder of the first aspect of the present invention contains particles each of which is mainly composed of zirconium nitride and has a surface to which an aluminum oxide-based composition partially adheres, and the aluminum-oxide-based-composition-containing zirconium nitride powder contains aluminum in a proportion of greater than 1% by mass and 15% by mass or less in terms of a total content of 100% by mass. Unlike an alumina-coated zirconium nitride powder described in Patent Document 2, the surface of each of the particles is not coated with alumina, and the aluminum oxide-based composition partially adheres to the surface of each of the zirconium nitride particles. In such zirconium nitride particles, the surface of each particle is not completely covered with aluminum oxide, so that the original optical characteristics of zirconium nitride are not impaired. As a result, in a case where the aluminum-oxide-based-composition-containing zirconium nitride powder is used as the black pigment to form the black patterned film, the aluminum oxide-based composition partially adheres to the surface of each zirconium nitride particle to ensure the gas barrier property and improve the moisture resistance. Furthermore, even though the powder is composed of fine particles having the BET specific surface area of 30 m$^2$/g to 90 m$^2$/g, the crystallinity of the zirconium nitride particles is kept high without being reduced, and the zirconium nitride particles are not coarsened. Therefore, the black patterned film has a high light transmittance in the ultraviolet range at a wavelength of 370 nm, and has high light shielding properties (low light transmittance) in the near infrared region at a wavelength of 1,000 nm.

In addition, since this aluminum-oxide-based-composition-containing zirconium nitride powder has the BET specific surface area of 30 m$^2$/g or greater, there is an effect of suppressing sedimentation when used as a resist, and since the powder has the BET specific surface area of 90 m$^2$/g or less, there is effect of having a sufficient visible light shielding property.

According to the aluminum-oxide-based-composition-containing zirconium nitride powder of the second aspect of the present invention, furthermore, in a transmission spectrum of the dispersion having a powder concentration of 50 ppm, the light transmittance X at 370 nm is 20% or greater, and the light transmittance Y at 1,000 nm is 35% or less, and X/Y is 1.2 or more, thereby achieving a feature of further transmitting ultraviolet rays. As a result, in a case where the aluminum-oxide-based-composition-containing zirconium nitride powder is used as the black pigment to form the black patterned film, a high-resolution patterned film can be formed, and furthermore, the formed patterned film has a higher visible light shielding performance.

In the method for producing an aluminum-oxide-based-composition-containing zirconium nitride powder of the third aspect of the present invention, as compared with the method described in Patent Document 2, which includes adding and mixing the aluminum compound into the zirconium nitride slurry to prepare the aluminum-coated zirconium nitride particles, and thereafter, firing the particles to produce the powder composed of the alumina-coated zirconium nitride particles, the aluminum-oxide-based-composition-containing zirconium nitride powder is produced by mixing zirconium oxide with the aluminum-containing powder, metallic magnesium powder, and magnesium oxide powder in a predetermined ratio, and performing a thermite reduction reaction at a temperature of higher than 900° C. and 1,100° C. or lower, thereby the aluminum oxide-based composition partially adhering to the surface of each zirconium nitride particle.

In the production method of Patent Document 2, since the zirconium nitride particles as a starting raw material were subjected to a grinding treatment for the purpose of coating the zirconium nitride particles with alumina, the crystallinity of zirconium nitride was reduced by grinding. By contrast, in the method of the third aspect of the present invention, since the zirconium nitride particles are not subjected to the grinding process, and the aluminum-containing particles contribute to the Thermite reduction reaction, the crystallinity of the aluminum-oxide-based-composition-containing zirconium nitride powder can be kept high without deteriorating the crystallinity.

The detailed mechanism of the Thermite reduction reaction is unknown, but it is expected that the aluminum-containing particles are used as a reaction material to cause the zirconium oxide particles to undergo the following side reactions in the Thermite reduction reaction, and as a result of the resultant effect, the favorable optical characteristics are obtained.

In a case where the aluminum-containing particles are made of alumina, a reduction reaction of alumina with magnesium is represented by Formula (1).

$$Al_2O_3+3Mg \rightarrow 2Al+3MgO \qquad (1)$$

The reduction of zirconium oxide by aluminum (Thermite reaction) is represented by Formula (2).

$$2Al+3ZrO_2 \rightarrow 2AlO_3+3Zr \qquad (2)$$

A nitriding reaction of metal zirconium is represented by the following Formula (3).

$$Zr+1/2N_2 \rightarrow ZrN \qquad (3)$$

The reactions represented by Formulae (1) to (3) proceed sequentially, thereby generating a mixture of zirconium nitride and the aluminum oxide-based compound.

Although metallic aluminum undergoes a Thermit reaction at a high temperature similar to metallic magnesium, the reaction is longer and slower than that of magnesium. Thus, zirconium nitride obtained as a reactant is prevented from becoming coarse particles, and formed in a small particle diameter shape excellent in uniformity to contribute to improvement of the transmittance particularly in the ultraviolet range.

In the production method of the fourth aspect of the present invention, since the aluminum-containing powder is a powder composed of any one or more of metallic aluminum, alumina, an aluminate compound, or aluminum hydroxide, during firing, all the particles of the powder are reduced by metallic magnesium to produce metallic aluminum as shown in Formula (1), thereby obtaining the zirconium nitride particles according to Formulae (2) and (3).

In a black dispersion of a fifth aspect of the present invention, since the aluminum-oxide-based-composition-containing zirconium nitride powder according to the first or second aspect is dispersed in a solvent or a monomer compound, there is a feature in that zirconium nitride shields visible rays while transmitting ultraviolet rays. As a result, this black dispersion is suitably used as a material for forming a black patterned film.

According to the black photosensitive composition of the sixth aspect of the present invention, since the aluminum-oxide-based-composition-containing zirconium nitride powder is contained as a black pigment, a high-resolution patterned film can be formed even though the use amount of a photoinitiator is reduced because of high UV transmittance in a case where the black patterned film is formed by using this composition.

The black patterned film according to the seventh aspect of the present invention has a high-resolution and has a high light shielding performance in a visible light and near infrared region.

Since the black matrix according to the eighth aspect of the present invention is obtained by using the above-described black patterned film, a fine pattern is achieved.

Since the light shielding material of the ninth aspect, the light shielding filter of the tenth aspect, and the black film of the eleventh aspect of the present invention are obtained by using the black patterned film, a high light shielding performance in a visible light and near infrared region is achieved.

DESCRIPTION OF EMBODIMENTS

Next, an embodiment for carrying out the present invention will be described.

Method for Producing Aluminum Oxide-Based Composition-Containing Zirconium Nitride Powder A characteristic point of a method for producing an aluminum-oxide-based-composition-containing zirconium nitride powder (hereinafter, also referred to as an end product) of the present embodiment is that a firing temperature of mixed particles is set to higher than 900° C. and 1,100° C. or lower.

Figure 3:
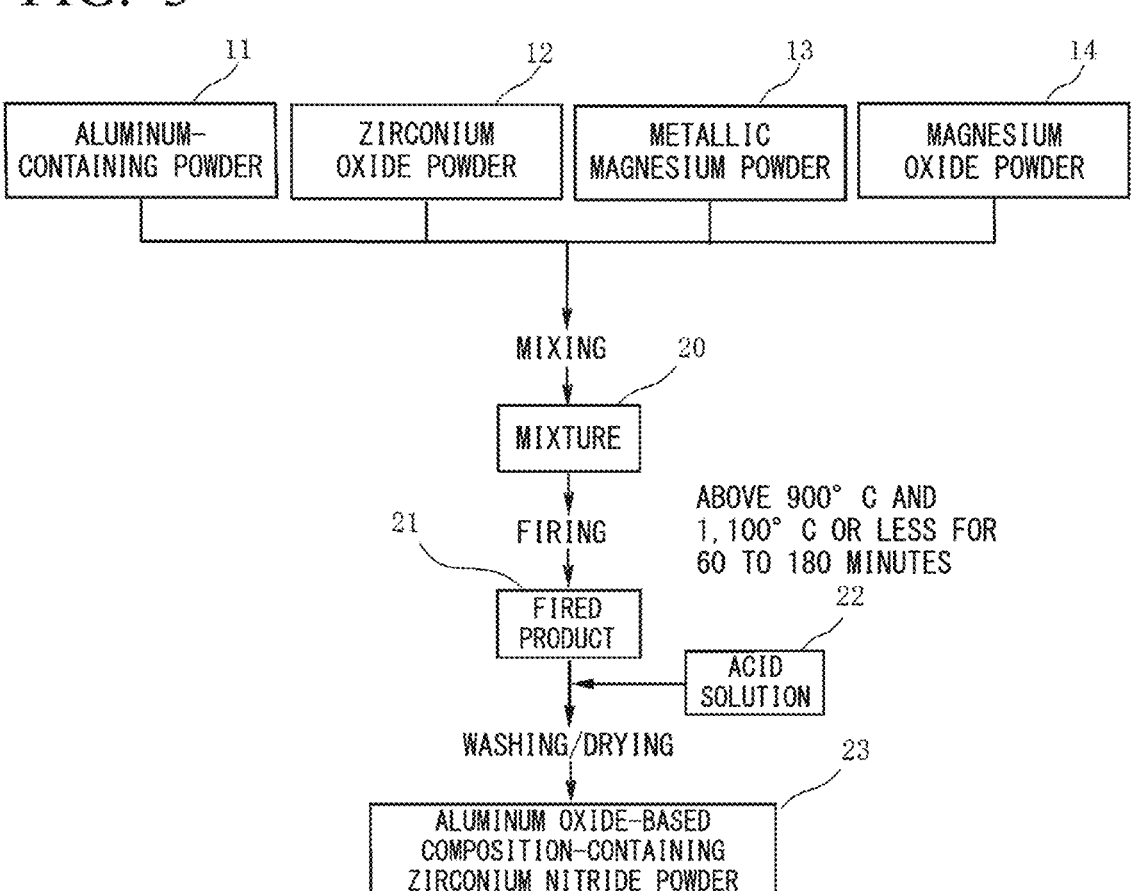
FIG. 3 is a flow chart showing the production of an aluminum-oxide-based-composition-containing zirconium nitride powder of the present embodiment.

Mixing of Aluminum-Containing Powder, $ZrO_2$ Powder, Metallic Mg Powder, and MgO Powder In the production method of the present embodiment, as shown in FIG. 3, an aluminum-containing powder 11 is mixed with a zirconium oxide ($ZrO_2$) powder 12 together with a metallic magnesium (metallic Mg) powder 13 and a magnesium oxide (MgO) powder 14 to obtain a mixture 20.

This mixture 20 is obtained by mixing the zirconium oxide powder 12 with the aluminum-containing powder 11 at a molar ratio of the aluminum-containing powder 11 of 0.05 to 0.8 per mole of zirconium oxide, and the metallic magnesium powder 13 at a molar ratio of the metallic magnesium powder 13 of 2.0 to 6.0 per mole of zirconium oxide, and the magnesium oxide powder 14 at a molar ratio of the magnesium oxide powder 14 of 0.3 to 5.0 per mole of zirconium oxide.

Aluminum-Containing Powder

The aluminum-containing powder 11 of the present embodiment is any one or more of metallic aluminum, alumina, an aluminate compound, and aluminum hydroxide. The aluminum-containing powder is reduced by metallic magnesium during firing, as shown in the above-described Formula (1), to produce metallic aluminum. Therefore, in a case where the aluminum-containing powder is metallic aluminum, the use amount of metallic magnesium can be minimized. Examples of the aluminate compound include alumina acid; alkali metal salts such as a lithium salt, sodium salt, and potassium salt of alumina acid; alkaline earth metal salts such as a magnesium salt and calcium salt of alumina acid; an ammonium salt of alumina acid, and the like. Preferred examples thereof include sodium aluminate and potassium aluminate.

In a case where the aluminum-containing powder 11 is a metallic aluminum powder, the metallic aluminum powder preferably has an average particle diameter of 1 μm to 20 μm. In a case where a content thereof is less than the lower limit value, a reaction is likely to proceed rapidly, and in a case where the content thereof is greater than the upper limit value, the reaction is less likely to proceed smoothly. In a case where the aluminum-containing powder 11 is a powder other than the metallic aluminum powder, this powder is an ionic compound and easily thermally decomposed. Thus, there is no limitation on the average particle diameter of the powder 11.

The variation of the addition amount of the aluminum-containing powder 11 to the zirconium oxide powder 12 affects the production amount of metallic aluminum. In a case where the amount of the aluminum-containing particles is too small, the Thermite reduction reaction by aluminum is unlikely to occur due to the shortage of metallic aluminum. In a case where the amount is too large, $ZrAl_3$, which is a compound of aluminum and zirconium, is produced, and the optical characteristics of the end product are deteriorated. The aluminum-containing powder 11 is added to and mixed with the zirconium oxide powder 12 at a molar ratio of aluminum of 0.05 to 0.8 per mole of zirconium oxide. In a case of less than a molar ratio of aluminum of 0.05 per mole of zirconium oxide, the production amount of metallic aluminum tends to be insufficient, and in a case of greater than a molar ratio of aluminum of 0.8 per mole of zirconium oxide, the optical characteristics of the end product are deteriorated. In particular, the molar ratio thereof is preferably 0.1 to 0.6 per mole of zirconium oxide. Here, the number of the aluminum-containing particles by mol is a molecular weight per aluminum atom constituting the aluminum-containing particles. For example, the number of alumina by mol is 50.98, which is half of the molecular weight of $Al_2O_3$ of 101.96.

Zirconium Oxide Powder

As the zirconium oxide powder 12 of the present embodiment, for example, any of zirconium dioxide powders such as monoclinic zirconium dioxide, cubic zirconium dioxide, and yttrium stabilized zirconium dioxide can be used, but from the viewpoint of an increase in the production rate of the zirconium nitride powder, monoclinic zirconium dioxide powder is preferable. Zirconium oxide usually contains about 2% by mass of hafnium as an inevitable impurity, but in a case where the content is at a level of 2% by mass, there is no influence on the optical characteristics.

Metallic Magnesium Powder

In a case where the particle diameter of the metallic magnesium powder 13 is too small, the reaction proceeds rapidly, resulting in a high risk in terms of operation. Thus, the particle diameter of the metallic magnesium powder 13 preferably has a granularity of 100 μm to 1,000 μm, and particularly preferably has a granularity of 200 μm to 500 μm in a mesh path of a sieve. However, even in a case where all the metallic magnesium powder 18 is not within the above particle diameter range, 80% by mass or greater, particularly 90% by mass or greater of the metallic magnesium powder 18 may be within the above range.

The variation of the addition amount of the metallic magnesium powder 13 to the zirconium oxide powder 12 affects the reduction power of zirconium oxide. In a case where the amount of metallic magnesium is too small, it is difficult to obtain the desired zirconium nitride particles due to insufficient reduction, and in a case where the amount of metallic magnesium is too large, a reaction temperature rapidly increases due to the excessive amount of metallic magnesium, which may cause the growth of the particles and is economically disadvantageous. Depending on the particle diameter of the metallic magnesium powder 13, the metallic magnesium powder 13 is added to and mixed with the zirconium oxide powder 12 so that a molar ratio of metallic magnesium is 2.0 to 6.0 per mole of zirconium oxide. In a case where the molar ratio of metallic magnesium is less than 2.0 per mole of zirconium oxide, the reduction power of zirconium oxide is likely to be insufficient, and in a case where the molar ratio thereof is greater than 6.0 per mole of zirconium oxide, the reaction temperature is likely to increase rapidly due to the excessive amount of metallic magnesium, which may cause growth of particles and is economically disadvantageous. The molar ratio of metallic magnesium is preferably 3.0 to 5.0 per mole of zirconium oxide.

Magnesium Oxide Powder

The magnesium oxide powder 14 is used to prevent the sintering of zirconium nitride produced by the reduction reaction of zirconium oxide with metallic magnesium. The use amount thereof varies depending on the particle diameter of the magnesium oxide, but a molar ratio of the magnesium oxide powder 14 is preferably 0.3 to 5.0 per mole of the zirconium oxide powder. The magnesium oxide powder 14 may be used in an amount to prevent the sintering of zirconium nitride, and in a case where the excessive amount thereof is used, the use amount of an acidic solution required for acid washing after the reaction increases. Therefore, it is preferable that the magnesium oxide powder 14 is used within the above-described range.

Firing of Mixture

The aluminum-containing powder 11, the zirconium oxide powder 12, the metallic magnesium powder 13, and the magnesium oxide powder 14 of the present embodiment are put into a reaction container (not shown), and a mixture 20 composed thereof is subjected to firing. The temperature during the reduction reaction with metallic magnesium for reducing the zirconium oxide powder 12 to produce a zirconium nitride powder, that is, the firing temperature is higher than 900° C. and 1,100° C. or lower, and preferably 950° C. to 1,000° C. In a case where the firing temperature is 900° C., which is the lower limit value, or lower, the aluminum-containing powder cannot be effectively used in the Thermite reduction reaction, and the reduction reaction of zirconium oxide does not sufficiently occur. In addition, even in a case where the temperature is higher than 1,100° C., the effect is not increased, the heat energy is wasted, and sintering of particles proceeds, which is not preferable. Furthermore, the reduction reaction time, that is, the firing time is 60 minutes to 180 minutes, and preferably 60 minutes to 120 minutes for the same reason as the reduction reaction temperature. The atmosphere gas during the reduction reaction, that is, during the firing, is a nitrogen gas atmosphere in order to prevent oxidation of a reduction product. In order to promote the reduction reaction, a mixed gas of nitrogen gas and hydrogen gas or a mixed gas of nitrogen gas and ammonia gas may be used. The mixture 20 is fired to obtain a fired product 21.

Process of Fired Product

The fired product 21 obtained by firing the mixture is taken out from the reaction container, finally cooled to room temperature, and then washed with an acid solution 22 such as a hydrochloric aqueous solution to remove magnesium oxide (MgO) contained from the beginning to prevent the firing of magnesium oxide and products, which are produced by oxidation of metallic magnesium, and magnesium nitride $(Mg_3N_2)$ produced by the firing. This acid washing is preferably performed at pH 0.5 or greater and particularly pH 1.0 or greater, and performed at a temperature of 90° C. or lower. This is because there is a concern that even zirconium may be eluted in a case where the acidity is too strong or the temperature is too high. Then, after the acid washing, the pH is adjusted to 5 to 6 with aqueous ammonia or the like, and thereafter, solid content is separated by filtration or centrifugation, the solid content is dried and then ground to obtain the aluminum-oxide-based-composition-containing zirconium nitride powder 23 of the present embodiment.

The aluminum-oxide-based-composition-containing zirconium nitride powder 23 may contain impurities that can be contained in the step, and derived from a raw material used, a material of the reaction container made of stainless steel, or the like. Examples of the impurities include magnesium salts such as magnesium chloride, magnesium oxide, ammonium salts such as ammonium chloride, fluorine, chlorine, bromine, metallic aluminum, aluminum nitride, carbon, adsorption water, iron, nickel, chromium, tungsten, molybdenum, vanadium, niobium, titanium, cobalt, potassium, copper, a hafnium compound, and other impurities. Even in a case where the aluminum-oxide-based-composition-containing zirconium nitride powder 23 contains a small amount (for example, 5% by mass or less) of these impurities, there is no particular effect on the optical characteristics, the electrical insulation, the characteristic changes in a constant temperature and constant humidity environment, and the like.

Characteristics of Aluminum Oxide-Based Composition-Containing Zirconium Nitride Powder In the aluminum-oxide-based-composition-containing zirconium nitride powder obtained in the present embodiment, the aluminum oxide-based composition derived from the aluminum-containing particles partially adheres to a surface of each particle mainly composed of zirconium nitride. In addition, aluminum is present on the surface of each particle in a proportion of greater than 1% by mass and 15% by mass or less in terms of a total content of the aluminum-oxide-based-composition-containing zirconium nitride powder of 100% by mass. In a case where this proportion is less than 1% by mass, a content of aluminum on the surface of each zirconium nitride particle is too small. Therefore, it is not possible to improve the moisture resistance of the particles, the effect of improving crystallinity and making particles fine and uniform by the Thermite reduction reaction including aluminum is not exhibited, and the light transmittance at a wavelength of 370 nm is decreased. On the other hand, in a case where the above-described proportion is greater than 15% by mass, the moisture resistance of the particles can be improved, but the light shielding properties in the near infrared region with a wavelength of 1,000 nm deteriorates because of a high dielectric constant of aluminum oxide. A preferred proportion thereof is 1.5% by mass to 10% by mass.

Figure 2:
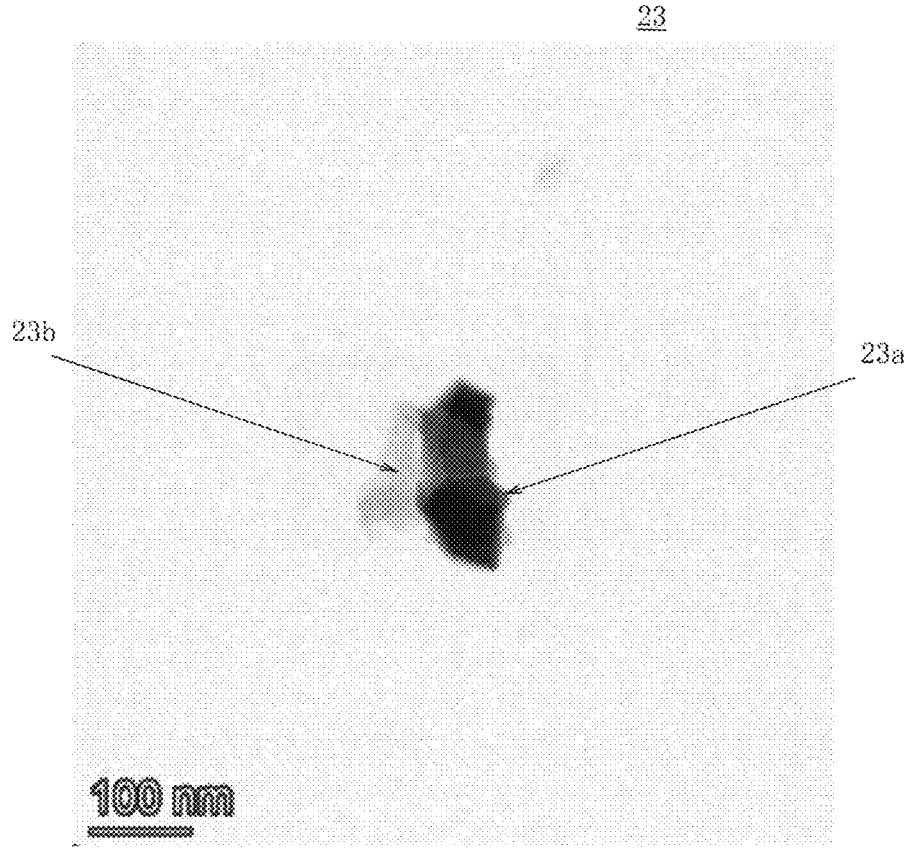
FIG. 2 is a scanning transmission electron microscope (STEM) image of zirconium nitride particles to which an aluminum oxide-based composition obtained in Example 3 adheres.

Regarding the morphology of the aluminum oxide-based composition in the aluminum-oxide-based-composition-containing zirconium nitride powder 23, it can be confirmed as shown in FIG. 2 that an aluminum oxide-based composition 23b partially adheres to a surface of a particle 23a mainly composed of zirconium nitride. However, it is not possible to confirm whether or not the aluminum oxide-based composition 23b is contained in the particle 23a at the present stage. In addition, in most cases, zirconium nitride is exposed on the surface of the zirconium nitride particle 23a to which no aluminum oxide-based composition adheres; however, an oxide layer composed of a thin aluminum compound may be made.

Whether the aluminum oxide-based composition adheres to the surface of the particle or not is confirmed to use a scanning transmission electron microscopy (STEM) and an energy dispersive X-ray spectroscopy (EDS). Specifically, the confirmation of the presence or absence of the aluminum oxide-based composition is carried out by the observation of the particle appearance under the condition of an acceleration voltage of 200 kV with a magnification at which 1 to 5 particles can be confirmed among magnifications of 10,000 times to 200,000 times using STEM (manufactured by Thermo Fisher Scientific Inc., trade name: Titan G2 Chem-iSTEM). Furthermore, the confirmation of the presence or absence is carried out, in the same visual field, by element mapping on an aluminum element, a zirconium element, an oxygen element, and a nitrogen element using EDS (manufactured by Thermo Fisher Scientific Inc., trade name: Velox) to distinguish the aluminum oxide-based composition from zirconium nitride. For simplicity, when observing the particle appearance, it is possible to distinguish the aluminum oxide-based composition from zirconium nitride based on the difference in contrast between an aluminum element and a zirconium element in a high-angle annular dark field (HAADF) image. Here, examples of the aluminum oxide-based composition include alumina (including $Al_2O_3$, α-alumina, θ-alumina, and γ-alumina), aluminum hydroxide $(Al(OH)_3)$, and the like.

The content proportion of aluminum is measured by an inductively coupled plasma emission spectroscopy (ICP emission spectroscopy manufactured by Shimadzu Corporation, trade name: ICPS-7510).

In addition, a BET specific surface area of the aluminum-oxide-based-composition-containing zirconium nitride powder is 30 $m^2/g$ to 90 $m^2/g$. In a case where the specific surface area of this zirconium nitride powder is less than 30 $m^2/g$, there is an issue that the sedimentation of a pigment occurs during long-term storage in a case of using a black resist, and in a case where the specific surface area thereof is greater than 90 $m^2/g$, there is an issue that the visible light shielding performance is insufficient when the powder is used as a black pigment to form a patterned film. The BET specific surface area thereof is more preferably 30 $m^2/g$ to 70 $m^2/g$. From the specific surface area, it is possible to calculate an average particle diameter regarded as spherical by the following Equation (6). The average particle diameter of the zirconium nitride particles of the present embodiment, which is calculated from the BET specific surface area, is 10 nm to 40 nm. In Equation (6), L is an average particle diameter (μm), ρ is a density of particles $(g/cm^3)$, and S is a specific surface area of particles $(m^2/g)$.

$$L = 6/(\rho \times S) \qquad (6)$$

In the aluminum-oxide-based-composition-containing zirconium nitride powder of the present embodiment, the aluminum oxide-based composition partially adheres to and is present on a surface of each zirconium nitride particle. As described in Patent Document 2, in a case where the surface of each zirconium nitride particle is completely coated with alumina, light on the long wavelength side of 1,000 nm is transmitted because alumina has a high dielectric constant. On the other hand, in a case where aluminum oxide partially adheres to a surface of each particle as in the case of the aluminum-oxide-based-composition-containing zirconium nitride powder of the present embodiment, a high light shielding performance is achieved because the shielding properties of zirconium nitride is maintained while the moisture resistance is improved. In addition, as described above, the aluminum-containing powder acts as an auxiliary agent for the Thermite reduction reaction. Therefore, there are effects of high crystallinity and making particles fine and uniform, and the light transmittance in an ultraviolet range with a wavelength of 370 nm is improved.

According to the aluminum-oxide-based-composition-containing zirconium nitride powder of the present embodiment, in a transmission spectrum of a dispersion having an aluminum-oxide-based-composition-containing zirconium nitride powder concentration of 50 ppm, a light transmittance X at 370 nm is preferably 20% or greater, and a light transmittance Y at 1,000 nm is preferably 35% or less. The dispersion is prepared by crushing and dispersing the aluminum-oxide-based-composition-containing zirconium nitride powder in a propylene glycol monomethyl ether acetate (PGM-Ac) solvent as a dispersion medium using a dispersion apparatus such as a bead mill (using zirconia beads having a diameter of 0.3 mm), for example. In order to make the dispersing of the particles in the dispersion more stable, for example, an amine-based dispersant may be used. The optical path length for measuring the light transmittance is 1 cm.

In a case where the light transmittance X is less than 20%, exposing to the bottom portion of a photoresist film is not achieved when the powder is used as the black pigment to form the patterned film, and undercut of the patterned film is likely to occur. In addition, in a case where the light transmittance Y is greater than 35%, the light shielding properties in the near infrared region of the formed patterned film is likely to be insufficient. The light transmittance X is still more preferably 25% or greater, and the light transmittance Y is even still more preferably 30% or less. In consideration of the above-described contradictory characteristics of the light transmittance X and the light transmittance Y, the aluminum-oxide-based-composition-containing zirconium nitride powder of the present embodiment preferably has a ratio (X/Y) of the light transmittance X at 370 nm to the light transmittance Y at 1,000 nm is 1.2 or greater, and still more preferably 1.3 or greater. That is, in a case where X/Y is 1.2 or greater, the effect of transmitting ultraviolet rays is exhibited, and prevention of undercut of the patterned film is likely to be preferred.

In the aluminum-oxide-based-composition-containing zirconium nitride powder as an end product, it is essential that the particles are sufficiently dispersed so that the particles do not aggregate. Sufficient dispersion is achieved by, for example, using a polymer-based dispersant containing a functional group such as phosphoric acid or amine and performing a dispersion treatment for a predetermined time by using a grinding media such as zirconia beads. Examples of an index of the dispersity include detecting no secondary aggregates larger than 200 nm by using a dynamic scattering particle size distribution analyzer (for example, trade name: UPA manufactured by Microtrack Surgicals., or trade name: SZ-100 manufactured by HORIBA, Ltd.)

Preparation of Black Dispersion

A black dispersion is prepared by dispersing the aluminum-oxide-based-composition-containing zirconium nitride powder as an end product in a solvent or a monomer compound such as an acrylic monomer or an epoxy monomer.

The acrylic monomer is a monomer having a (meth) acryloyl group. The (meth)acryloyl group includes an acryloyl group and a methacryloyl group. The acrylic monomer may be a monofunctional acrylic monomer having one (meth)acrylic group in one molecule, or may be a polyfunctional acrylic monomer having two or more (meth)acrylic groups in one molecule. The acrylic monomer may be a mixture of two or more thereof.

Examples of the monofunctional (meth)acrylic monomers include (meth)acrylic acid, methyl (meth)acrylate, ethyl (meth)acrylate, propyl (meth)acrylate, n-butyl (meth)acrylate, isobutyl (meth)acrylate, 2-ethylhexyl (meth)acrylate, octyl (meth)acrylate, isooctyl (meth)acrylate, isodecyl (meth)acrylate, lauryl (meth)acrylate, stearyl (meth)acrylate, benzyl (meth)acrylate, phenyl (meth)acrylate, phenoxyethyl (meth)acrylate, 2-hydroxyethyl (meth)acrylate, 2-hydroxypropyl (meth)acrylate, isoamyl acrylate, tetrahydrofurfuryl (meth)acrylate, isobornyl (meth)acrylate, and the like. The acrylic monomer may be a mixture of two or more thereof.

Examples of a difunctional (meth)acrylic monomer include 1,6-hexanediol di(meth)acrylate, 1,9-nonanediol di(meth)acrylate, neopentyl glycol di(meth)acrylate, polyethylene glycol di(meth)acrylate, ethylene oxide-modified bisphenol A di(meth)acrylate, neopentyltriethylene glycol di(meth)acrylate, and the like. The acrylic monomer may be a mixture of two or more thereof.

Examples of a polyfunctional (meth)acrylic monomer include pentaerythritol tri(meth)acrylate, pentaerythritol tetra(meth)acrylate, trimethylolpropane tri(meth)acrylate, and the like. The acrylic monomer may be a mixture of two or more thereof.

The epoxy monomer has an epoxy group. The epoxy monomer may be a monofunctional epoxy monomer having one epoxy group in one molecule, or may be a polyfunctional epoxy monomer having two or more epoxy groups in one molecule. Examples of the epoxy monomer include glycidyl ether, cycloaliphatic epoxy, and the like. The acrylic monomer may be a mixture of two or more thereof.

The black dispersion, which is a monomer dispersion, is added to a polymer to produce a resin composition containing the zirconium nitride particles in a dispersed state, and a resin molded article is made of this resin composition. In addition, the black dispersion, which is the monomer dispersion, further contains metal oxide particles and can further contain a plasticizer.

Examples of the plasticizer include, but not particularly limited thereto, conventionally known plasticizers, such as phosphate ester-based plasticizers such as tributyl phosphate and 2-ethylhexyl phosphate, phthalate ester-based plasticizers such as dimethyl phthalate and dibutyl phthalate, aliphatic-basic ester-based plasticizers such as butyl oleate and glycerin monooleate, aliphatic dibasic acid ester-based plasticizers such as dibutyl adipate and di-2-ethylhexyl sebacate; dihydric alcohol ester-based plasticizers such as diethylene glycol dibenzoate and triethylene glycol di-2-ethyl butyrate; oxyacid ester-based plasticizers such as methyl acetyl ricinoleate and tributyl acetyl citrate. Two or more kinds thereof may be mixed and used.

It is possible to further add another monomer to the black dispersion, which is the monomer dispersion. The other monomer is not particularly limited, and examples thereof include conventionally known monomers, such as (meth) acrylic monomers such as (meth)acrylic acid and a (meth) acrylic acid ester, styrene-based monomers such as styrene, vinyl toluene, and divinyl benzene, vinyl-based monomers such as vinyl chloride and vinyl acetate, urethane-based monomers such as urethane acrylate, and the various polyols described above. Two or more kinds thereof may be mixed and used. The viscosity of the monomer dispersion is preferably set in a range of 10 Pa·s to 1,000 mPa·s in consideration of the dispersibility of the zirconium nitride particles.

In dispersing in the monomer, it is also possible to use a mill method using a grinding media, as in the case of the dispersing in a solvent described below. In addition, it is also possible to use a polymer dispersant, which is not an essential component, but is used to further improve the dispersibility. It is effective that the polymer dispersant has a molecular weight of several thousand to several tens of thousands.

In addition, examples of a functional group of the polymer dispersant, which is adsorbed onto the pigment, include a secondary amine, a tertiary amine, a carboxylic acid, a phosphoric acid, and a phosphoric acid ester, and a tertiary amine and a carboxylic acid are particularly effective. Two or more kinds thereof may be mixed and used. It is also effective to add a small amount of a silane coupling agent instead of the polymer dispersant to improve the dispersibility. On the other hand, it is also possible to obtain a black dispersion by carrying out planetary stirring and passing the stirred mixture through the three rolls several times.

Also for the black dispersion dispersed in the solvent, it is effective to add a polymer dispersant as in the case of the black dispersion in which the monomer compound is dispersed. It is effective that the polymer dispersant has a molecular weight of several thousand to tens of thousands as that of the black dispersion in which the monomer compound is dispersed, and a tertiary amine or a carboxylic acid is effective as a functional group of the polymer dispersant. Examples of the solvent include isopropanol (IPA), butyl acetate (BA), methyl ethyl ketone (MEK), and the like. A mixture of these may also be used.

Preparation of Black Photosensitive Composition

The aluminum-oxide-based-composition-containing zirconium nitride powder as an end product is dispersed as a black pigment in a dispersion medium, and a resin is further mixed thereto to prepare a black composition. Examples of the dispersion medium include propylene glycol monomethyl ether acetate (PGM-Ac), methyl ethyl ketone (MEK), butyl acetate (BA), and the like, and a mixture thereof may also be used. In addition, examples of the resin include a photosensitive acrylic resin, an epoxy resin, and the like.

Method for Forming Patterned Film Using Aluminum Oxide-Based Composition-Containing Zirconium Nitride Powder as Black Pigment A method for forming a patterned film represented by a black matrix using the zirconium nitride powder as a black pigment will be described. First, the zirconium nitride powder is dispersed in a solvent to prepare a black dispersion. It is preferable to use an amine-based dispersant. Examples of the solvent include propylene glycol monomethyl ether acetate (PGM-Ac), diethyl ketone, butyl acetate, and the like. A photosensitive acrylic resin is added to and mixed with this dispersion in a proportion of the black pigment:the resin=(10:90) to (80:20) in terms of mass ratio to prepare a black photosensitive composition. Next, this black photosensitive composition is applied onto a substrate, and then prebaked to evaporate the solvent, thereby forming a photoresist film. Next, the photoresist film is exposed to form a predetermined pattern shape through a photomask, subsequently developed with an alkali developing solution to dissolve and remove unexposed portions of the photoresist film, and thereafter, preferably post-baked, thereby forming a predetermined black patterned film.

Examples of the substrate include glass, silicon, polyethylene terephthalate, polycarbonate, polyester, aromatic polyamide, polyamide imide, polyimide, and the like. In addition, the substrate can be subjected to appropriate pretreatment such as chemical treatment with a silane coupling agent or the like, plasma treatment, ion plating, sputtering, a gas-phase reaction method, or vacuum deposition, as desired. In a case where the black photosensitive composition is applied onto the substrate, it is possible to employ an appropriate coating method such as rotary coating, flow coating, or roll coating. The coating thickness is usually 0.1 μm to 10 μm, preferably 0.2 μm to 7.0 μm, and still more preferably 0.5 μm to 6.0 μm as the film thickness after drying. In the present embodiment, as the radiation used in the formation of the patterned film, an electromagnetic wave having a wavelength in a range of 250 nm to 370 nm is preferable. The integrated light amount of the electromagnetic wave is preferably 10 $J/m^2$ to 10,000 $J/m^2$.

In addition, examples of the alkali developing solution include aqueous solutions of sodium carbonate, sodium hydroxide, potassium hydroxide, tetramethylammonium hydroxide, choline, 1,8-diazabicyclo-[5.4.0]-7-undecene, 1,5-diazabicyclo-[4.3.0]-5-nonene, and the like. A water-soluble organic solvent such as methanol or ethanol, a surfactant, or the like can be appropriately added to the alkali developing solution. After the alkali development, washing with water is usually carried out. As a developing treatment method, a shower development method, a spray development method, a dip (immersion) development method, a puddle (liquid accumulation) development method, or the like can be applied, and the development condition is preferably 5 seconds to 300 seconds at room temperature. The patterned film formed in the above-described manner is suitably used for a high-definition liquid crystal, a black matrix for organic EL, a light shielding material for image sensors, a light shielding material for optical members, a light shielding filter, an IR cut filter, and the like. In addition, the black patterned film is used as an element constituting the black film. Specifically, a black film is provided with a support film and the black patterned film on the support film.

EXAMPLES

Next, Examples of the present invention will be described in detail together with Comparative Examples.

Example 1

0.3 g of a metallic aluminum powder (0.24 mole with respect to zirconium oxide) having an average particle diameter of 5 μm as the aluminum-containing powder, 3.9 g of a metallic magnesium powder (4.0 mole with respect to zirconium oxide), and 2.3 g of a magnesium oxide powder (1.4 mole with respect to zirconium oxide) were mixed with 5 g of a monoclinic zirconium dioxide powder having a BET specific surface area of 30 $m^2/g$. The number of moles in parentheses is a ratio with respect to 1 mole of zirconium oxide. The BET specific surface area was measured by using nitrogen as an adsorbate as described later. This mixture was placed in a reaction container and fired at a temperature of 950° C. for 60 minutes in a nitrogen gas atmosphere. This fired product was dispersed in 0.1 liter of water, washed by gradually adding 10% hydrochloric acid while maintaining pH of 1 or more, and a temperature of 90° C. or lower, adjusted to pH of 7 to 8 with 2.5% aqueous ammonia, and filtered. The filtered solid content was redispersed in 0.4 liters of water, and subjected to acid washing, pH adjustment with aqueous ammonia, and then filtration in the same manner as described above again. After repeating acid washing and pH adjustment with aqueous ammonia twice in this manner, the filtrate was dispersed in ion exchange water at 5 g/L in terms of solid content, heated and stirred at 60° C., and adjusted to pH 7, and the resultant product was then filtered with a suction filtration device, further washed with an equal amount of ion exchange water, and dried by a hot air dryer set at a temperature of 120° C. to obtain a powder of an end product. The production conditions of Example 1 are shown in Table 1 below.

TABLE 1

Production conditions of aluminum oxide-based composition-containing zirconium nitride powder

| | Specific surface area of $ZrO_2$ (m²/g) | $ZrO_2$ (mole) | Aluminum source (aluminum-containing powder) Kind | Average particle diameter | Al source/ $ZrO_2$ (molar ratio) | Metallic Mg/ $ZrO_2$ (molar ratio) | MgO/ $ZrO_2$ (molar ratio) | MgN/ $ZrO_2$ (molar ratio) | Firing atmosphere | Firing temperature (° C.) | Firing time (min) |
|---|---|---|---|---|---|---|---|---|---|---|---|
| Example 1 | 30 | 1 | Metallic aluminum | 5 μm | 0.24 | 4.0 | 1.4 | — | Nitrogen | 950 | 60 |
| Example 2 | 30 | 1 | Metallic aluminum | 5 μm | 0.07 | 4.0 | 0.8 | — | Nitrogen | 1000 | 120 |
| Example 3 | 30 | 1 | Metallic aluminum | 5 μm | 0.59 | 5.0 | 5.0 | — | Nitrogen | 1100 | 120 |
| Example 4 | 30 | 1 | Metallic aluminum | 20 μm | 0.12 | 2.0 | 1.5 | — | Nitrogen | 1000 | 60 |
| Example 5 | 30 | 1 | Alumina | BET20 m²/g | 0.17 | 3.0 | 1.0 | — | Nitrogen | 1000 | 60 |
| Example 6 | 90 | 1 | Alumina | BET200 m²/g | 0.48 | 6.0 | 0.3 | — | Nitrogen | 1000 | 120 |
| Example 7 | 30 | 1 | Sodium aluminate | — | 0.4 | 4.0 | 1.4 | — | Nitrogen | 1000 | 60 |
| Example 8 | 30 | 1 | Potassium aluminate | — | 0.29 | 4.0 | 1.4 | — | Nitrogen | 1000 | 60 |
| Example 9 | 30 | 1 | Aluminum hydroxide | — | 0.34 | 4.0 | 1.0 | — | Nitrogen | 1000 | 60 |
| Example 10 | 30 | 1 | Metallic aluminum | 5 μm | 0.07 | 5.0 | 0.8 | — | Nitrogen | 930 | 180 |
| Comparative Example 1 | 30 | 1 | — | — | — | 5.0 | — | 0.5 | Nitrogen | 700 | 60 |
| Comparative Example 2 | 30 | 1 | — | — | — | 6.0 | — | 2.0 | Nitrogen | 700 | 60 |
| Comparative Example 3 | 30 | 1 | Metallic aluminum | 5 μm | 0.85 | 5.0 | 0.5 | — | Nitrogen | 1000 | 120 |
| Comparative Example 4 | 30 | 1 | Metallic aluminum | 5 μm | 0.04 | 4.0 | 1.5 | — | Nitrogen | 800 | 60 |
| Comparative Example 5 | 30 | 1 | Aluminum hydroxide | — | 0.12 | 5.0 | — | 0.5 | Nitrogen | 700 | 60 |

Examples 2 to 10 and Comparative Examples 3 and 4

When a powder of each end product of Examples 2 to 10, and Comparative Examples 3 and 4 was produced, the BET specific surface area of the zirconium oxide ($ZrO_2$) powder was the same as or changed from that in Example 1, and the kind of aluminum-containing particles serving as an aluminum source, an average particle diameter, and the addition amount were the same as or changed from those in Example 1. In addition, each of the addition proportion of the metallic magnesium (metallic Mg) powder and the magnesium oxide (MgO) powder to the zirconium oxide ($ZrO_2$) powder, atmosphere, temperature, and time during the firing were set to be the same as or changed from those in Example 1 to obtain a powder of each end product of Examples 2 to 10 and Comparative Examples 3 and 4. The results are shown in Table 1 above. Furthermore, a scanning transmission electron microscope (STEM) image of the particles of Example 3 is shown in FIG. 2. FIG. 2 shows the aluminum-oxide-based-composition-containing zirconium nitride powder 23 formed by a gray aluminum oxide-based composition 23b partially adhering to the surface of the black zirconium nitride particle 23a.

Comparative Example 1

In Comparative Example 1, particles as an end product were obtained by a method of Example 1 according to claim 3 of Patent Document 1. A monoclinic zirconium dioxide powder having a BET specific surface area of 30 m²/g without an aluminum source was used as a starting raw material.

Specifically, to 7.4 g of the monoclinic zirconium dioxide powder having a specific surface area of 30 m²/g by the BET method were added 7.3 g of a metallic magnesium powder having an average primary particle diameter of 150 μm and 3.0 g of a magnesium nitride powder having an average primary particle diameter of 200 nm, and the mixture was mixed uniformly by using a reactor equipped with a graphite boat in a quartz glass tube. At this time, the amount of metallic magnesium was added at a molar ratio of metallic magnesium of 5.0 per mole of zirconium dioxide, and the amount of magnesium nitride was added at a molar ratio of magnesium nitride of 0.5 per mole of zirconium dioxide. This mixture was fired in a nitrogen gas atmosphere at a temperature of 700° C. for 60 minutes to obtain a fired product. This fired product was dispersed in 0.1 liter of water, washed by gradually adding 10% hydrochloric acid while maintaining pH of 1 or more, and a temperature of 90° C. or lower, adjusted to pH of 7 to 8 with 2.5% aqueous ammonia, and filtered. The filtered solid content was redispersed in 0.4 liters of water, and subjected to acid washing, pH adjustment with aqueous ammonia, and then filtration in the same manner as described above again. After repeating acid washing and pH adjustment with aqueous ammonia twice in this manner, the filtrate was dispersed in ion exchange water at 5 g/L in terms of solid content, heated and stirred at 60° C., and adjusted to pH 7, and the resultant product was then filtered with a suction filtration device, further washed with an equal amount of ion exchange water, and dried by a hot air dryer set at a temperature of 120° C. to obtain a powder of an end product.

Comparative Example 2

In Comparative Example 2, a powder of an end product was obtained by a method of Example 3 according to claim 4 of Patent Document 1.

7.4 g of the same zirconium dioxide powder as that in Example 1 was dispersed in ethanol, and this mixture was added to and mixed with a silicate sol-gel solution (silica content: 0.1522 g) containing ethyl silicate as a main component to prepare a slurry with a solid content concentration of 30% by mass. This slurry was dried under an atmospheric atmosphere at a temperature of 70° C. for 120 minutes by a box-type dryer to obtain a zirconium dioxide powder that is coated with silica and has an average primary particle diameter of 50 nm. This powder included 3.0% by mass of silica ($SiO_2$) in zirconium dioxide. To 7.5 g of this zirconium dioxide powder were added 8.8 g of a metallic magnesium powder having an average primary particle diameter of 300 μm and 2.1 g of a magnesium nitride powder having an average primary particle diameter of 500 nm, and the mixture was uniformly mixed in the same manner as in Example 1. At this time, the amount of metallic magnesium was added at a molar ratio of metallic magnesium of 6.0 per mole of zirconium dioxide, and the amount of magnesium nitride was added at a molar ratio of magnesium nitride of 2.0 per mole of zirconium dioxide. Hereinbelow, a zirconium nitride powder was obtained in the same manner as in Comparative Example 1.

Comparative Example 5

In Comparative Example 5, a powder of an end product was obtained by a method shown in Example 1 according to claim 2 of Patent Document 2. An aluminum hydroxide solution was used instead of powder as the aluminum source.

Specifically, to 7.4 g of the monoclinic zirconium dioxide powder having a BET specific surface area of 30 $m^2$/g were added 7.3 g of a metallic magnesium powder having an average primary particle diameter of 150 μm and 3.0 g of a magnesium nitride powder having an average primary particle diameter of 200 nm, and the mixture was mixed uniformly by using a reactor equipped with a graphite boat in a quartz glass tube. At this time, the amount of metallic magnesium was added at a molar ratio of metallic magnesium of 5.0 per mole of zirconium dioxide, and the amount of magnesium nitride was added at a molar ratio of magnesium nitride of 0.5 per mole of zirconium dioxide. This mixture was fired in a nitrogen gas atmosphere at a temperature of 700° C. for 60 minutes to obtain a fired product. This fired product was dispersed in 0.1 liter of water, washed by gradually adding 17.5% hydrochloric acid while maintaining pH of 1 or more, and a temperature of 90° C. or lower, adjusted to pH of 7 to 8 with 2.5% aqueous ammonia, and filtered. The filtered solid content was redispersed in 0.4 liters of water, and subjected to acid washing, pH adjustment with aqueous ammonia, and then filtration in the same manner as described above again. After repeating acid washing and pH adjustment with aqueous ammonia twice in this manner, the filtrate was dispersed in ion exchange water at 5 g/L in terms of solid content, heated and stirred at 60° C., and adjusted to pH 7, and the resultant product was then filtered with a suction filtration device, further washed with an equal amount of ion exchange water, and dried by a hot air dryer set at a temperature of 120° C. to obtain a zirconium nitride powder.

The above-described zirconium nitride powder was ground in water by a bead mill (using zirconia beads having a diameter of 0.3 mm) to obtain a slurry in which zirconium nitride particles having an average primary particle diameter of 30 nm were dispersed. A 5% aluminum hydroxide solution (a solution obtained by dissolving aluminum hydroxide in caustic soda) was added to the ground zirconium nitride slurry (a concentration of 10% by mass of zirconium nitride powder (black pigment)) so that $Al_2O_3$ is 5% by mass with respect to 100% by mass of zirconium nitride. The slurry at this time had pH of 10. Next, 17.5% hydrochloric acid was added dropwise to the slurry until the pH reached 5. Accordingly, aluminum hydroxide was deposited on the surfaces of the zirconium nitride particles. The slurry was washed by decantation several times, and then filtered to collect a cake (debris deposited on the surface of the filter media). The obtained cake was held and fired at a temperature of 300° C. for 1 hour in a nitrogen atmosphere to obtain a powder of an end product in which particle surfaces were coated with aluminum oxide.

The production conditions of Comparative Example 1, Comparative Example 2, and Comparative Example 5 are shown in Table 1 described above.

Comparative Test

The powder of each end product of Examples 1 to 10 and Comparative Examples 1 to 5 was used as a sample. From these samples, the presence or absence of the aluminum oxide-based composition was confirmed, the kind of particles was determined therefrom, and the content proportion of aluminum was measured. The confirmation and measurement were performed by the method described above. Next, for these samples, (1) measuring the BET specific surface area, (2) reading from the spectral curves of the light transmittance X at 370 nm and the light transmittance Y at 1,000 nm, and calculating X/Y were carried out. Furthermore, (3) moisture resistance was measured. The results are shown in Table 2 below. In Table 2, "Aluminum oxide" is described as "Al oxide".

(1) BET specific surface area: BET specific surface areas of all samples were measured by a BET single-point method using nitrogen adsorption using a specific surface area measuring device (trade name SA-1100, manufactured by SIBATA SCIENTIFIC TECHNOLOGY LTD.).

Figure 1:
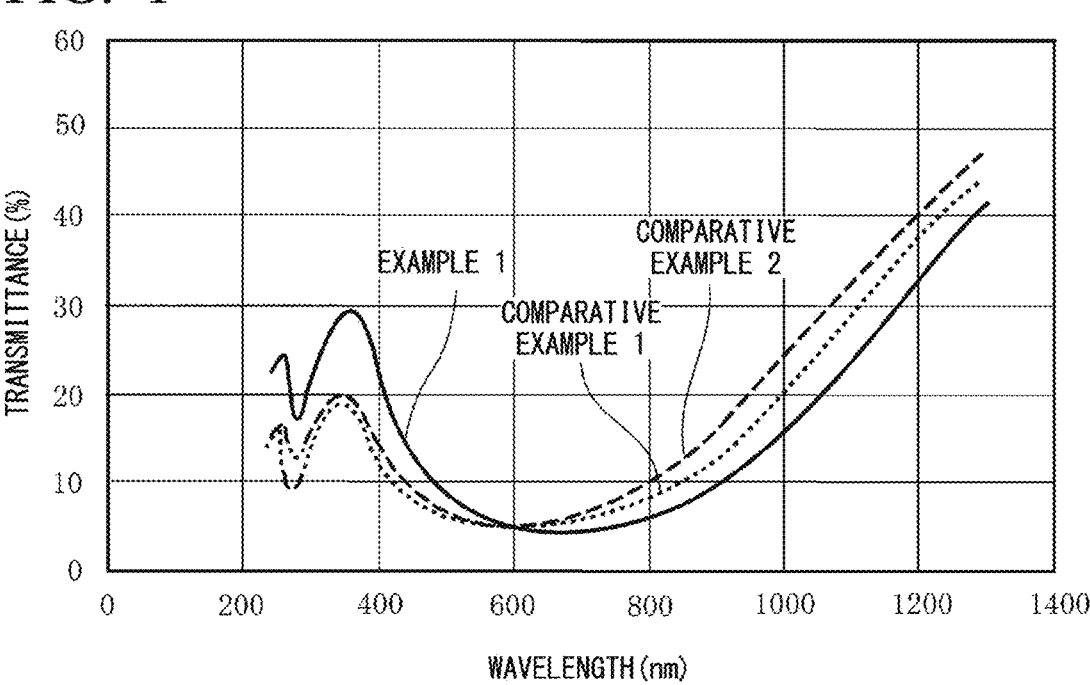
FIG. 1 is a spectral curve showing light transmittance a dispersion obtained by diluting a dispersion of zirconium nitride powder, which is obtained in each of Example 1, Comparative Example 1, and Comparative Example 2, to a particle concentration of 50 ppm.

(2) Spectral curve in dispersion having powder concentration of 50 ppm: Regarding each of samples of Examples 1 to 10 and Comparative Examples 1 to 5, these samples were separately put in a circulating horizontal bead mill (medium:zirconia), an amine-based dispersant was added thereto to carry out dispersion treatment in a propylene glycol monomethyl ether acetate (PGM-Ac) solvent. The obtained 15 kinds of dispersions were further diluted 100,000 times with a propylene glycol monomethyl ether acetate (PGM-Ac) solvent to adjust the powder concentration to 50 ppm. The light transmittance of each sample in the diluted dispersion was measured at a wavelength in a range of 240 nm to 1,300 nm at an optical path length of 1 cm using UH-4150 (trade name, manufactured by Hitachi High-Tech Corporation) to obtain a spectral curve. The light transmittance X at a wavelength of 370 nm in the vicinity of the i-line (365 nm) and the light transmittance Y at a wavelength of 1,000 nm were read from the spectral curve. FIG. 1 shows three spectral curves of Example 1 and Comparative Examples 1, 2, and 3.

X/Y was calculated from the light transmittance X and the light transmittance Y read from the spectral curves of each sample of Examples 1 to 10 and Comparative Examples 1 to 5.

(3) Moisture resistance: In order to confirm the effect of containing aluminum, the moisture resistance of all the samples was examined.

An amine-based dispersant was added to the particles of each of Examples 1 to 10 and Comparative Examples 1 to 5, and the particles were subjected to a dispersion treatment in a propylene glycol monomethyl ether acetate (PGM-Ac) solvent to prepare a dispersion. An acrylic resin was added to this dispersion in a proportion of black pigment:resin=5:5 by mass ratio, and mixed to prepare a black composition. The black composition was applied onto a glass substrate by spin coating and kept at a temperature of 250° C. for 30 minutes to obtain a dried coating film having a thickness of 1 μm. The volume resistivity of the coating film was measured.

A sample of the produced coating film was placed in a thermo-hygrostat set at a temperature of 60° C. and a humidity of 90% for 100 hours, and a high temperature and humidity resistance test was carried out. The coating film volume resistivity of each film before and after the test was measured at a voltage of 1,000 V using a HIRESTA (trade name) (model number: MCP-HT800) manufactured by Nittoseiko Analytech Co., Ltd. Regarding the moisture resistance of the sample, in a case where a ratio R of Equation (7), which is obtained from a difference in surface resistivity of each film before and after the test, was less than 50%, the moisture resistance was determined as "Favorable". In addition, a case where the difference was 50% or greater was determined as "Poor" in that there was no moisture resistance.

$$R = \left[ (\text{resistivity after change} - \text{resistivity before change}) / \text{resistivity before change} \right] \times 100 \qquad (7)$$

TABLE 2

| | | | Powder of end product | | | | | |
|---|---|---|---|---|---|---|---|---|
| | Presence or absence of Al oxide on surface of powder | Kind | Content proportion of Al (% by mass) | Specific surface area (m²/g) | Light transmittance X (370 nm) (%) | Light transmittance Y (1,000 nm) (%) | X/Y | Moisture resistance |
| Example 1 | Presence | Al oxide-based composition-containing ZrN | 5.0 | 65 | 29.5 | 16.0 | 1.84 | Favorable |
| Example 2 | Presence | Al oxide-based composition-containing ZrN | 1.1 | 31 | 24.0 | 20.0 | 1.20 | Favorable |
| Example 3 | Presence | Al oxide-based composition-containing ZrN | 15.0 | 61 | 41.0 | 33.0 | 1.24 | Favorable |
| Example 4 | Presence | Al oxide-based composition-containing ZrN | 3.0 | 40 | 32.0 | 26.5 | 1.21 | Favorable |
| Example 5 | Presence | Al oxide-based composition-containing ZrN | 4.0 | 36 | 27.0 | 19.0 | 1.42 | Favorable |
| Example 6 | Presence | Al oxide-based composition-containing ZrN | 9.0 | 89 | 42.0 | 34.0 | 1.24 | Favorable |
| Example 7 | Presence | Al oxide-based composition-containing ZrN | 8.0 | 67 | 35.0 | 21.0 | 1.67 | Favorable |
| Example 8 | Presence | Al oxide-based composition-containing ZrN | 6.0 | 50 | 30.0 | 22.0 | 1.36 | Favorable |
| Example 9 | Presence | Al oxide-based composition-containing ZrN | 7.0 | 46 | 31.0 | 25.0 | 1.24 | Favorable |
| Example 10 | Presence | Al oxide-based composition-containing ZrN | 1.1 | 30 | 23.0 | 20.0 | 1.15 | Favorable |
| Comparative Example 1 | Absence | ZrN | — | 24 | 18.0 | 20.0 | 0.90 | Poor |
| Comparative Example 2 | Absence | Silica-containing ZrN | — | 65 | 19.5 | 25.0 | 0.78 | Poor |
| Comparative Example 3 | Presence | Al oxide-based composition-containing ZrN | 17.0 | 100 | 40.0 | 43.0 | 0.93 | Favorable |

TABLE 2-continued

| | | | Powder of end product | | | | | |
|---|---|---|---|---|---|---|---|---|
| | Presence or absence of Al oxide on surface of powder | Kind | Content proportion of Al (% by mass) | Specific surface area $(m^2/g)$ | Light transmittance X (370 nm) (%) | Light transmittance Y (1,000 nm) (%) | X/Y | Moisture resistance |
| Comparative Example 4 | Presence | Al oxide-based composition-containing ZrN | 0.7 | 26 | 19.0 | 18.0 | 1.06 | Poor |
| Comparative Example 5 | Presence | Alumina-coated ZrN | 4.0 | 24 | 29.0 | 30.6 | 0.95 | Favorable |

Evaluation

As is clear from Table 2, in Comparative Example 1 and Comparative Example 2, when the powder of the end product was observed by STEM, it was confirmed that no aluminum compound was present on the surfaces of these zirconium nitride particles. When the inside of these particles was examined with an electron beam diffractometer, alumina was not present. The moisture resistance was poor because the surfaces of these particles were not coated with alumina, and the particles did not contain the aluminum oxide-based composition. The effect of improving crystallinity and making particles fine and uniform by the Thermite reduction reaction including the aluminum compound was not exhibited, and the transmittance X at 370 nm of Comparative Example 1 was 18.0%, the transmittance X at 370 nm of Comparative Example 2 was 19.5%, so that both were less than 20%. As a result, the transmittance to ultraviolet rays was low, and the X/Y values were 0.90 and 0.78, respectively.

In Comparative Example 3, the addition amount of the metallic aluminum powder, which is the aluminum-containing powder, was as large as 25% by mass (at a molar ratio of metallic aluminum powder of 0.85 per mole of zirconium oxide), and the content proportion of aluminum in the powder of the end product was too large at 17.0% by mass. When the powder of this end product was observed by STEM, it was confirmed that the surfaces of most zirconium nitride particles were coated with the aluminum compound. Therefore, this powder had a favorable moisture resistance. However, since the excessive alumina compound had light transmittance, the transmittance Y at 1,000 nm was 43.0%, and the X/Y value was 0.93, which was less than 1.2. In addition, since the BET specific surface area was as large as 100 $m^2/g$, the powder of the end product was insufficiently dispersed, and the visible light shielding property was also reduced.

In Comparative Example 4, the addition amount of the metallic aluminum powder, which is the aluminum-containing powder, was as small as 1.5% by mass (at a molar ratio of metallic aluminum powder of 0.04 per mole of zirconium oxide), and the content proportion of aluminum in the powder of the end product was too small at 0.7% by mass. Therefore, when the powder of this end product was observed by STEM, it was confirmed that a small amount of the aluminum compound adhered to the surfaces of the zirconium nitride particles. In addition, in this powder, the effect of improving crystallinity and making particles fine and uniform by the Thermite reduction reaction including the aluminum compound was not exhibited, and the transmittance X at 370 nm was 19.0%, which was less than 20%, and the X/Y value was 1.06, which was less than 1.2, resulting in lowering of the transmittance to ultraviolet rays. In addition, the moisture resistance was poor because the content proportion of the aluminum oxide-based composition was low.

In Comparative Example 5, since the aluminum hydroxide solution was added to the zirconium nitride slurry to produce the zirconium nitride powder, when the powder of this end product was observed by STEM, it was confirmed that the surfaces of the zirconium nitride particles were coated with alumina. Moisture resistance of this powder was favorable, but the particles were completely coated with alumina. Therefore, the alumina inhibited the light shielding performance of zirconium nitride, and the X/Y value was 0.95, which was less than 1.2.

On the other hand, the end products of Examples 1 to 10 were aluminum-oxide-based-composition-containing zirconium nitride powders, and when the powders of these end products were observed by STEM, it was confirmed that the aluminum compound partially adhered to the surfaces of all zirconium nitride particles. When analyzed with an electron beam diffractometer, the aluminum compound was present as amorphous aluminum oxide in the powders of all of end products. Furthermore, the moisture resistance of the powders of all of end products was favorable, and the content proportion of aluminum was in a range of greater than 1% by mass and 15% by mass or less. That is, it was found that the end products of Examples 1 to 10 satisfied the requirements of the first aspect of the present invention, had high light shielding performance against visible light rays, and were advantageous for patterning because the end products transmit ultraviolet rays.

In particular, it was found that the end products of Examples 1 to 9 having the BET specific surface area in a range of 30 $m^2/g$ to 90 $m^2/g$, the light transmittance X at 370 nm of 20% or greater, the light transmittance Y at 1,000 nm of 35% or less, and a ratio (X/Y) of the light transmittance X at 370 nm to the light transmittance Y at 1000 nm of 1.2 or greater satisfied the requirements of the second aspect of the present invention, had a higher visible light shielding performance, and transmitted ultraviolet rays, so that the end products were more advantageous to patterning.

INDUSTRIAL APPLICABILITY

The aluminum-oxide-based-composition-containing zirconium nitride powder of the present invention can be used for a high-definition liquid crystal, a black matrix for organic EL, a light shielding material for image sensors, a light shielding material for optical members, a light shielding filter, an IR cut filter, a black film, and the like and thus can be industrially applicable.

What is claimed is:

1. An aluminum-oxide-based-composition-containing zirconium nitride powder comprising:

particles each of which is mainly composed of zirconium nitride and has a surface to which an aluminum oxide-based composition partially adheres, wherein the aluminum-oxide-based-composition-containing zirconium nitride powder contains aluminum in a proportion of greater than 1% by mass and 15% by mass or less in terms of a total content of 100% by mass, and has a specific surface area of 30 $m^2$/g to 90 $m^2$/g measured by a BET method, and wherein in a case where a dispersion is prepared so that a concentration of the aluminum-oxide-based-composition-containing zirconium nitride powder is 50 ppm, and a transmission spectrum of the dispersion is measured, a light transmittance X at 370 nm is 20% or greater, a light transmittance Y at 1,000 nm is 35% or less, and a ratio (X/Y) of the light transmittance X at 370 nm to the light transmittance Y at 1,000 nm is 1.2 or greater.

2. A method for producing the aluminum-oxide-based-composition-containing zirconium nitride powder according to claim 1, the method comprising:

mixing a zirconium oxide powder with an aluminum-containing powder at a molar ratio of the aluminum-containing powder of 0.05 to 0.8 per mole of the zirconium oxide powder, a metallic magnesium powder at a molar ratio of the metallic magnesium powder of 2.0 to 6.0 per mole of the zirconium oxide powder, and a magnesium oxide powder at a molar ratio of the magnesium oxide powder of 0.3 to 5.0 per mole of the zirconium oxide powder to obtain a mixture; and firing the mixture at a temperature of higher than 900° C. and 1,100° C. or less for 60 minutes to 180 minutes in a nitrogen gas atmosphere to reduce the zirconium oxide powder.

3. The method for producing the aluminum-oxide-based-composition-containing zirconium nitride powder according to claim 2, wherein the aluminum-containing powder is a powder composed of any one or more of metallic aluminum, alumina, an aluminate compound, or aluminum hydroxide.

4. A black dispersion that is formed by dispersing the aluminum-oxide-based-composition-containing zirconium nitride powder according to claim 1 in a solvent or a monomer compound.

5. A black photosensitive composition comprising the aluminum-oxide-based-composition-containing zirconium nitride powder according to claim 1 as a black pigment.

6. A black patterned film that is obtained by using the black photosensitive composition according to claim 5.

7. A black matrix that is obtained by using the black patterned film according to claim 6.

8. A light shielding material that is obtained by using the black patterned film according to claim 6.

9. A light shielding filter that is obtained by using the black patterned film according to claim 6.

10. A black film comprising a support film and the black patterned film according to claim 6 on the support film.

11. The aluminum-oxide-based-composition-containing zirconium nitride powder according to claim 1, wherein the aluminum-oxide-based-composition-containing zirconium nitride powder contains aluminum in a proportion of 1.1% by mass or more, and the light transmittance X at 370 nm is 23.0% or greater.

* * * * *